US007230726B2

(12) United States Patent
Holzapfel et al.

(10) Patent No.: US 7,230,726 B2
(45) Date of Patent: Jun. 12, 2007

(54) SCANNING UNIT FOR A POSITION MEASURING INSTRUMENT FOR OPTICAL SCANNING OF A OBJECT MEASURING GRADUATION

(75) Inventors: Wolfgang Holzapfel, Obing (DE); Elmar Mayer, Nussdorf (DE); Ulrich Benner, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 440 days.

(21) Appl. No.: 10/821,518

(22) Filed: Apr. 9, 2004

(65) Prior Publication Data

US 2004/0246500 A1 Dec. 9, 2004

(30) Foreign Application Priority Data

Apr. 11, 2003 (DE) ................. 103 17 736

(51) Int. Cl.
*G01B 11/14* (2006.01)
(52) U.S. Cl. .................. 356/616; 250/231.13
(58) Field of Classification Search ........ 356/614–623; 250/237 G, 559.29, 231.14
See application file for complete search history.

(56) References Cited

U.S. PATENT DOCUMENTS

| 4,112,295 | A | * | 9/1978 | Dubik et al. ............ 250/237 G |
| 4,766,307 | A | * | 8/1988 | Pelgrom et al. ......... 250/208.3 |
| 5,251,012 | A | | 10/1993 | Riegger et al. |
| 5,822,125 | A | | 10/1998 | Meyers |
| 6,437,345 | B1 | | 8/2002 | Bruno-Raimondi et al. |
| 6,449,099 | B2 | | 9/2002 | Fujimoto et al. |
| 6,603,115 | B1 | | 8/2003 | Gordon-Ingram |
| 6,963,409 | B2 | * | 11/2005 | Benner et al. ............ 356/616 |
| 2001/0024327 | A1 | | 9/2001 | Fujimoto et al. |
| 2004/0118758 | A1 | | 6/2004 | Gordon-Ingram |
| 2004/0227958 | A1 | * | 11/2004 | Benner et al. ............ 356/616 |
| 2005/0168757 | A1 | * | 8/2005 | Benner et al. ............ 356/616 |

FOREIGN PATENT DOCUMENTS

| DE | 197 55 565 A1 | 6/1998 |
| DE | 100 22 619 A1 | 12/2001 |
| EP | 0 470 420 A1 | 2/1992 |
| EP | 1 099 936 A1 | 5/2001 |
| JP | 2004-529344 A | 9/2004 |
| WO | WO 02/084223 A1 | 10/2002 |

OTHER PUBLICATIONS

Anderson, R.H., "Close-up imaging of documents and displays with lens arrays," *Applied Optics*, vol. 18, No. 4, Feb. 15, 1979, pp. 477-484.
Shaoulov, Vesselin, et al., "Compact Relay Lenses Using Microlenslet Arrays," *Proc. Of SPIE*, vol. 4832, 2002, pp. 74-79.

* cited by examiner

*Primary Examiner*—Hoa Q. Pham
(74) *Attorney, Agent, or Firm*—Brinks Hofer Gilson & Lione (57) ABSTRACT

A scanning unit for a position measuring instrument for optical scanning of a measuring graduation. The scanning unit includes a light source that emits light in a direction towards a measuring graduation that generates modified light from the emitted light. A detector that receives the modified light. A lens array, disposed upstream of the detector and including a plurality of optical lenses, that generates a defined image of a region of the measuring graduation, scanned by the emitted light, on the detector, wherein an image magnification of the lens array is greater than 0 and less than or equal to 2.

35 Claims, 5 Drawing Sheets

SCANNING UNIT FOR A POSITION MEASURING INSTRUMENT FOR OPTICAL SCANNING OF A OBJECT MEASURING GRADUATION

Applicants claim, under 35 U.S.C. §119, the benefit of priority of the filing date of Apr. 11, 2003 of a German patent application, copy attached, Serial Number 103 17 736.1, filed on the aforementioned date, the entire contents of which is incorporated herein by reference.

BACKGROUND OF THE INVENTION

1. Field of the Invention

The present invention relates to a scanning unit for a position measuring instrument for optical scanning of a measuring graduation.

2. Discussion of Related Art

A scanning unit of this kind includes a light source for transmitting light in the direction of the measuring graduation, which is provided with an optically scannable track; a detector, for receiving the light modified, for instance reflected, by the measuring graduation; and a lens array, disposed upstream of the detector and having a plurality of optical lenses, for generating a defined image of a region of the measuring graduation, scanned by the light, on the detector.

Such a scanning unit can be intended for scanning a measuring graduation that has a code track by the incident light process or transmitted light process. In the first case, the light emitted by the light source in the direction of the measuring graduation is modified and reflected by the measuring graduation; in the second case, the light emitted by the light source passes through the (transparent) measuring graduation and is modified in the process.

From European Patent Disclosure EP 1 099 936 A1, a position measuring instrument is known in which a measuring graduation can be scanned by a light source and a detector in the form of a CCD array. Between the measuring graduation provided on a measuring graduation and the detector, a plurality of lenses disposed in one plane side by side are provided, by way of which the measuring graduation disposed on the measuring graduation is projected onto the detector.

OBJECT AND SUMMARY OF THE INVENTION

An object of the present invention is to create a scanning unit for a position measuring instrument of the type defined at the outset that makes it possible to use identical detectors for scanning a measuring graduation by the incident light process and by the transmitted light process.

This object is attained according to the present invention by the creation of a scanning unit for a position measuring instrument for optical scanning of a measuring graduation. The scanning unit includes a light source that emits light in a direction towards a measuring graduation that generates modified light from the emitted light. A detector that receives the modified light. A lens array, disposed upstream of the detector and including a plurality of optical lenses, that generates a defined image of a region of the measuring graduation, scanned by the emitted light, on the detector, wherein an image magnification of the lens array is greater than 0 and less than or equal to 2.

Accordingly, the image magnification of the lens array, which is used to generate a defined image of the scanned region of the measuring graduation on the detector, is greater than 0 and less than or equal to 2.

By the positive image magnification of the lens array, it is attained that the image of the scanned region of the measuring graduation that is generated on the detector has the same three-dimensional orientation regardless of whether the measuring graduation is scanned by the incident light process or the transmitted light process. As a result, even in code tracks with absolute position information (such as a PRC code), a type of detector, based for instance on a certain opto-ASIC, is used in the same way in both a transmitted light and an incident light position measuring instrument, because the positive image magnification assures correct projection and evaluation of a code track of the measuring graduation.

In a preferred embodiment, the lens array is embodied such that the image magnification assumes the value of 1. An image magnification with a value greater than 1, however, can for instance serve to enlarge very tiny structures on the measuring graduation.

The lens array includes a plurality of lenses, disposed in at least one plane, which are oriented such that the light modified by the measuring graduation intersects that plane. For that purpose, the plane extends on the one hand in the measurement direction along which the scanning unit is movable relative to the measuring graduation; on the other hand, it also extends perpendicular to that direction.

In particular, the lens array includes two groups of lenses, which are each disposed in one of two planes extending parallel to one another, and the lenses of the two groups that are associated with different planes are each combined in pairs to form one cell, and that the lenses of one cell are each disposed one after the other, perpendicular to the two planes.

The disposition of the lenses to form cells is done such that at least some of the modified light beams that have passed through a first lens of one cell that is disposed in one plane then reach the second lens of the cell that is disposed in a second plane; preferably essentially all the beams of light that have passed through the first lens of one cell then reach the second lens of the same cell, not a second lens of another cell.

The image magnification of the lens array provided according to the present invention can be achieved in particular by providing that for each cell, the product of the image magnifications of the two lenses is less than or equal to 1 and in particular is equal to 1. Preferably for each cell, the amount of the image magnification of the first lens is less than the amount of the image magnification of the second lens, which the light reaches, once it has passed through the first lens. This means that the intermediate image generated by the first lens of the applicable cell has a lesser length than the image of the scanned region of the measuring graduation that is finally generated on the detector by the two lenses of the cell.

Because the amount of the image magnification of the first lens of the applicable cell is selected to be enough less than the amount of the image magnification of the second lens that the beams of a focused beam which has passed through the first lens of one cell do not reach a second lens of another cell, crosstalk between adjacent cells can be prevented without using a diaphragm structure. For this purpose, in particular, the focal lengths of the lenses of the first group and of the second group of the lens array can be selected to be different; the focal length of the lenses that the light modified by the measuring graduation passes through first is greater than the focal length of the other, second lenses of the cells.

On the other hand, a diaphragm structure may be provided, to avoid crosstalk between adjacent cells. This diaphragm structure can for instance be disposed in the plane of the particular group of lenses which the light modified by the measuring graduation passes through first. Alternatively, the diaphragm structure can be disposed between the two groups of lenses. In that case, each cell can be assigned a separate diaphragm of the diaphragm structure.

The individual lenses of the lens array are preferably curved in cylindrical form and in plan view can for instance be embodied as rectangular, elliptical, or radially symmetrical.

Both diffractive and refractive optical elements are suitable for forming the individual lenses.

Moreover, it can be provided that the lenses of the lens array have only a partly focusing optical effect, for instance only in the measurement direction of the applicable position measuring instrument.

The light generated by the light source and modified by the measuring graduation can, before reaching the measuring graduation or after modification by the measuring graduation, be parallelized by at least one lens (condenser lens) provided for this purpose and disposed upstream or downstream of the measuring graduation. However, it is also possible to operate a scanning unit with divergent light.

A position measuring instrument with a scanning unit of the present invention and with a measuring graduation to be scanned by it that has at least one optically scannable track as defined later in the present description.

The optically scannable track of the measuring graduation can either be an absolutely coded track, which is scanned with a suitable linear line sensor, or an incremental track, which in turn is assigned a suitable, known detector. If both a code track and an incremental track are provided on the measuring graduation, then the detector accordingly includes both detector regions suitable for scanning a code track and detector regions suitable for scanning an incremental track.

Further characteristics and advantages of the present invention will become clear from the ensuing description of exemplary embodiments in conjunction with the drawings.

DETAILED DESCRIPTION OF THE PREFERRED EMBODIMENTS

Figure 1:
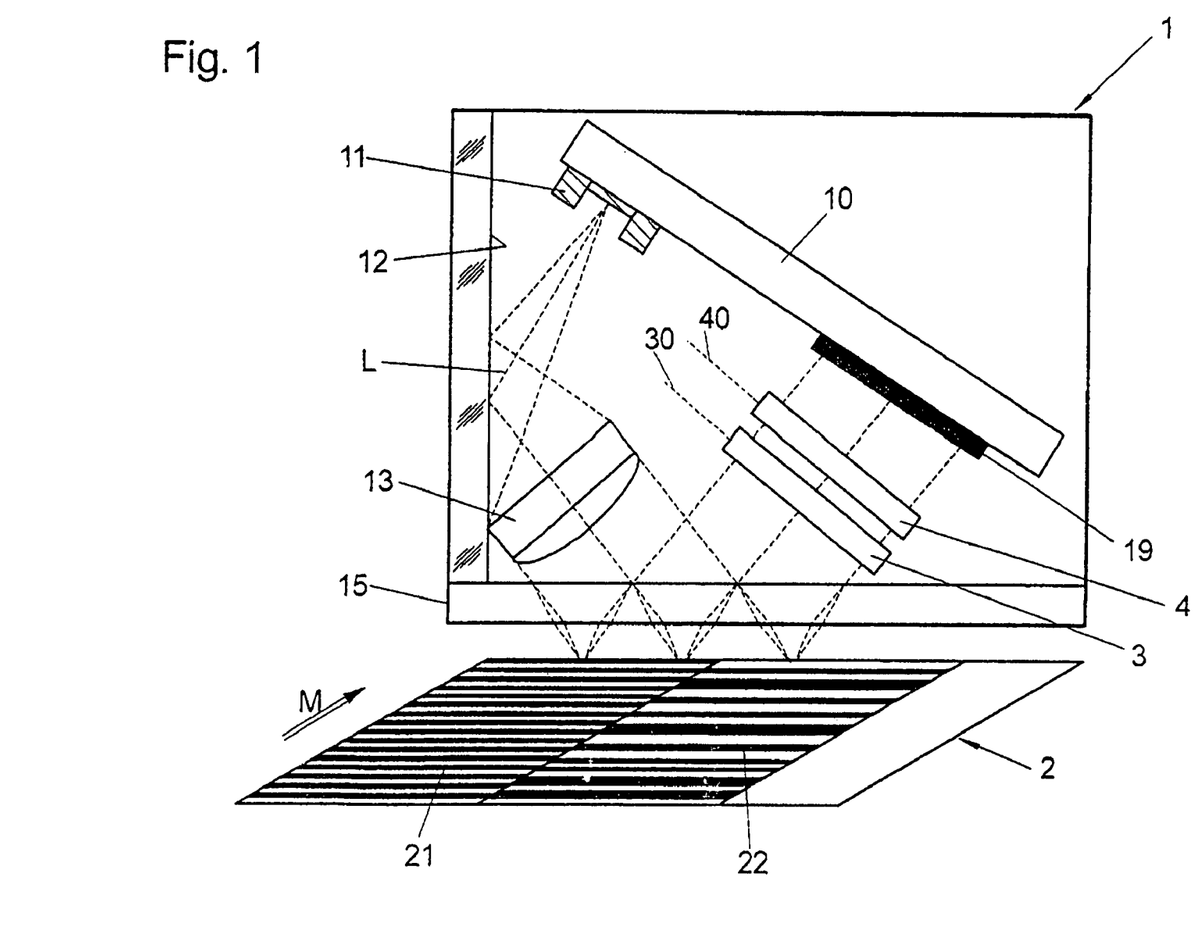
FIG. 1 shows an embodiment of a position measuring instrument with an embodiment of a scanning unit for scanning a measuring graduation by the incident light process, in which an embodiment of a lens array is provided between the measuring graduation and an embodiment of a detector of the position measuring instrument in accordance with the present invention.

FIG. 1 shows a position measuring system for a length measurement in a measurement direction M, having a measuring graduation 2 and a scanning unit 1, movable in the measurement direction M relative to the measuring graduation 2, for the scanning the measuring graduation 2.

The measuring graduation 2 has an incremental track 21, in the form of a linear, periodic graduation made up of lines that extends in the measurement direction M, as well as a code track 22 with absolute position information (such as a PRC code), disposed next to the incremental track 21 and likewise extending in the measurement direction M. By scanning the incremental track 21 by the scanning unit 1 upon a motion of the scanning unit 1 relative to the measuring graduation 2 in the measurement direction M, the length of the motion of the scanning unit 1 relative to the measuring graduation 2 (relative motion) can be ascertained. By comparison, the code track 22 makes it possible to determine the absolute position at a given time of the scanning unit 1 relative to the measuring graduation 2.

The optoelectronic scanning unit 1 used for scanning the measuring graduation 2 has a printed circuit board 10, on which a light source 11, in the form of a light-emitting diode, and spaced apart from the light source 11 a photoelectric detector 19 are disposed; the detector has alternating radiation-sensitive regions and radiation-insensitive gaps, whose orientation is adapted to the orientation of the respective associated measuring graduation 21, 22. The photoelectric detector 19 may for instance be embodied like the structured optoelectronic photodetector known from German Patent Disclosure DE 100 22 619 A1.

The printed circuit board 10 having the light source 11 and the photoelectric detector 19 is disposed in a scanner housing, whose side wall 12, toward the light source 11, is mirror-coated as a reflection face and which reflects the beams of light L, emitted by the light source 11, to a condenser lens 13, from which these beams of light L are then carried as a parallelized focused bean to the measuring graduation 2, through a glass plate 15 that forms the bottom face of the scanner housing.

Above the incremental track 21, the glass plate 15 has a scanning grating with a grating structure that deviates slightly from the grating constant of the incremental track 21 of the measuring graduation 2, so that from the interaction of the two grating structures, a virtual striped pattern—for instance, a so-called Vernier striped pattern—in an intermediate plane is generated which then is projected onto the detector 19 via a lens system 3, 4. Above the code track 22, conversely, the glass plate 15 is unstructured.

In FIG. 1, the position measuring system is embodied as a system operating by the incident light process, so that the light emitted by the light source 11 and parallelized by the condenser lens 13 is reflected, after passing through the glass plate 15, by the measuring graduation 2; a defined striped pattern is generated by the cooperation of the incremental track 21 of the measuring graduation 2 and the grating structure of the glass plate 15, or by modification of the beams of light by the code track 22, a characteristic image of the PRC code of the code track 22 can be generated. Alternatively, the condenser lens can be disposed between the measuring graduation and the lens array instead.

Below, the generation of a correct image of the code track 22 on the detector 19 in particular will be described in further detail, because the embodiment of the lens array 3, 4 with a positive image magnification in accordance with the present invention is of particular significance in that case.

The reflected light reaches the lens array 3, 4, which is formed by two groups of lenses that are each disposed in one of two planes 30, 40 extending parallel to one another. Each of the two lens groups 3 and 4 includes a plurality of lenses disposed side-by-side (a so-called micro lens array) in the respective plane 30 and 40. The planes 30, 40 in which the two lens groups 3, 4 of the lens array extend are disposed such that they are intersected essentially at a right angle by the beams of light L reflected by the measuring graduation 2. Alternatively, the two planes in the scanning unit housing could instead be disposed parallel to the measuring graduation.

In this kind of double lens array, which includes two groups of lenses disposed at a defined spacing from one another and parallel to one another, precisely one individual lens of the second group 4 can be assigned to each individual lens of the first lens group 3. As a result, with lenses without a waveguide structure, a positive image magnification, that is, an image magnification with a value greater than 0 and in particular with the value of 1, can be realized. Such an image magnification in turn makes it possible for the image regions of the individual lenses to adjoin one another continuously with a defined three-dimensional orientation. The use of a lens array with two lens groups 3, 4, spaced apart from one another along the optical axis, makes large-area scanning of the measuring graduation 2 possible with at the same time a low structural height and hence a compact embodiment of the position measuring system.

In this respect an embodiment of the lens array such that the image magnification assumes the value of 1 is especially advantageous. Because the same pattern is used for both lens groups 3, 4, or in other words the same disposition of the individual lenses in the respective plane 30, 40, the (correspondingly patterned) image regions of the image generated on the detector 19 by the lens array 3, 4 merge directly and continuously with one another. Accordingly, uniform projection conditions prevail in the entire lens array 3, 4.

Figure 2:
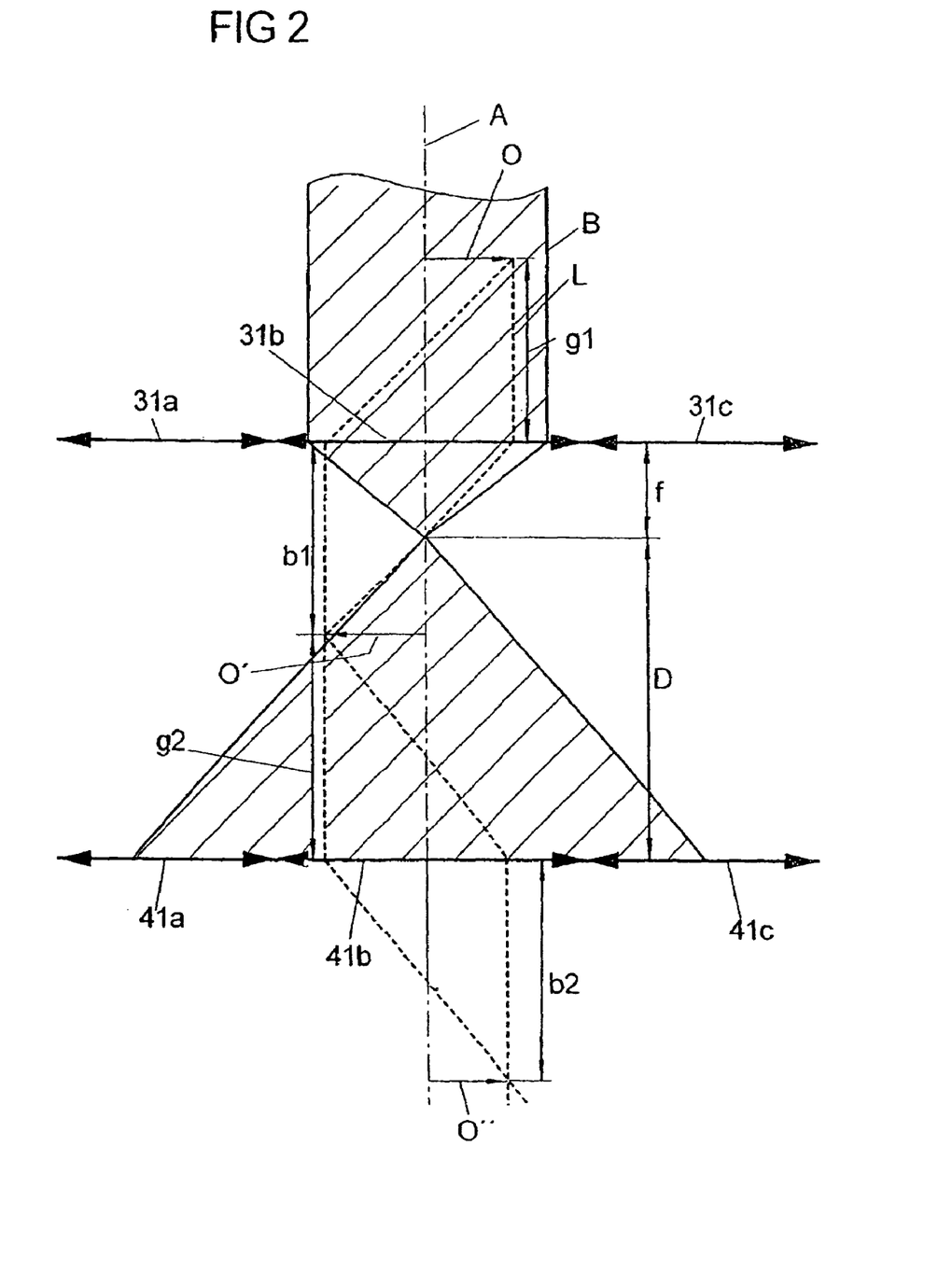
FIG. 2 is a section through a portion of the lens array of FIG. 1.

FIG. 2 shows a detail of a cross section through the lens array 3, 4 of FIG. 1, which includes a total of three cells of the lens array. One cell 31a, 41a; 31b, 41b; 31c, 41c of the lens array 3, 4 is understood to mean two individual lenses 31a, 41a; 31b, 41b; and 31c, 41c, each disposed one after the other in different planes, in the lens array 3, 4, and of the two lenses of one cell, one originates in the first lens group 31a, 31b, 31 c and the other in the second lens group 41a, 41b, 41c of the lens array 3, 4.

In the detail of the lens array 3, 4 shown as an example in FIG. 2, a central cell 31b, 41b, which includes one lens 31b from the first lens group 31a, 31b, 31c and one lens 41b from the second lens group 41a, 41b, 41c, can be seen along with two further lens groups 31a, 41a and 31c, 41c, one on either side of the central lens group 31b, 41b. The function of the lens array 3, 4, subdivided into cells, will be described in further detail below, in particular in terms of the central cell 31b, 41b of FIG. 2.

The central cell 31b, 41b includes a first individual lens 31b, which forms one component of the first lens group 31a, 31b, 31c (see FIG. 1) and is disposed in the corresponding plane 30, and a second individual lens 41b, which is disposed downstream of the first individual lens 31b of the cell in the optical axis A and which, as a component of the second lens group 41a, 41b, 41c, is located in the corresponding parallel plane 40. In the same way, the individual lenses of the further cells 31a, 41a; 31c, 41c along the optical axis A of the lens array 3, 4 are each disposed one after the other. All in all, the first lenses 31a, 31b, 31c of the cells form a component of the first lens group 31a, 31b, 31c, and the second lenses 41a, 41 b, 41c of a given cell form a component of the second lens group 41a, 41b, 41c of the lens array 3, 4.

FIG. 2 schematically shows a parallel focused beam B, reflected by the measuring graduation 2 (see FIG. 1); this beam extends essentially along the optical axis A of the lens array 3, 4 and upon reflection at the measuring graduation 2 is modified by the code of the code track 22, of which in FIG. 2 one component is indicated as an example in the form of an object O.

The code track 22 is projected by the lens array 3, 4 onto the detector 19 of the scanning unit 1 (see FIG. 1), as explained below taking as an example the object O and one cell 31b, 41b of the lens array 3, 4. For this purpose, individual beams of light L of the parallelized focused beam B are shown separately.

By the first lens 31b of the corresponding cell 31b, 41b, an intermediate image O' of the object O representing the code track is generated, from which then, by the second lens 41b of the cell 31b, 41 b, the image O" to be evaluated is generated on the detector 19 (see FIG. 1). Since the image magnification β of the lens array 3, 4 and in this case in particular each individual cell as well is equal to 1, the image O" has the same three-dimensional orientation and the same size as the object O representing the code track. To this extent, with the lens array described in conjunction with FIGS. 1 and 2, an image of the code track can be generated which corresponds to the image generated upon scanning of a measuring graduation by the transmitted light process. This makes it possible to use the same detector type in position measuring instruments that scan by both the transmitted light process and the incident light process.

Some important properties and advantages of the arrangement shown in FIG. 2 will now be summarized once again.

One important advantage of the image magnification β=1 is demonstrated upon observation of the change in the image width b2 of the second lens 41b of the cell, referred to a change in the object width g1 of the first lens 31b of the cell 31b, 41b:

$$b2/g1 = -\beta^2 = -1.$$

From this relationship, it can be seen that a slight displacement of the two lens groups 3, 4 relative to a fixed object O and the associated image O" still makes a sharp projection possible. Therefore correspondingly high tolerances in mounting the lens array 3, 4 are acceptable.

To achieve the above-described, advantageous 1:1 projection of an extended region of an object, namely a code track, by the lens array 3, 4, in which the region to be projected is to be markedly larger than the length of the individual lenses of the lens array, the following equation must apply to the product of the image magnifications β1 and β2 of the first lens 31b and the second lens 41b of the applicable cell 31b, 41b:

$$\beta1 * \beta2 = 1,$$

in which β1 and β2 are each negative. β1 and β2 should be selected such that optimal properties in terms of the quality of the projection are attained.

Below, it will first be assumed that the lenses of the two lens arrays 3, 4 each have an identical focal length f, and that the first projection (leading to the intermediate image O') generated by a given cell (such as 31b, 41b) of the lens array 3, 4 has the image magnification β1, and the second projection has the image magnification β2; also, g1 and b1 below designate the object width and image width of the first projection, and g2 and b2 designate the object width and image width of the second projection (leading to the projection O"), and D indicates the difference between the spacing of the two lenses 31b, 41b of a cell and the focal length f. The following equation then applies:

$$f + D = b1 + g2 = f(1 + |\beta 1|) + f(1 + 1/|\beta 2|),$$

with the transformation being done using the projection equations for b1 and g2.

Because $\beta 1 * \beta 2 = 1$, it is true that $$D = f*(1+2*|\beta 1|).$$

In FIG. 2, the corresponding path of the focused beam B associated with the central cell 31b, 41b, given collimated lighting, is shown shaded. The focused beam B associated with the central cell 31b, 41b includes all those beams of light L that pass through the first lens 31b of the this cell 31b, 41b. It can be seen from FIG. 2 that at the focal point f of the first lens 31b, the light of the focused beam B is first focused and thereafter diverges again. As a result, not all the light of the focused beam B reaches the second lens 41b of the corresponding cell 31b, 41b; instead, it also reaches the second lenses 41a, 41c of further cells 31a, 41a and 31c, 41c, respectively. This crosstalk interferes with the individual projection behavior of the individual cells and moreover extracts light from each of the individual cells. To reduce this crosstalk, the differential value D between the spacing of the two lenses 31b, 41b of one cell and the focal length f must be minimized; this is because this limits the spread of the cone of light that diverges downstream of the focal point f. In accordance with the above equation, this is achieved by minimizing the image magnification $\beta 1$ of the first projection.

Especially advantageous conditions exist, given matching lens pattern constants in the first and second lens groups 31a, 31b, 31c; 41a, 41b, 41c, if the differential value D is equal to the focal length f1 of the first lens 31b of the respective cell 31b, 41b. A collimated focused beam B arriving along the optical axis (that is, perpendicular to the planes 30, 40 of the lens groups 31a, 31b, 31c; 41a, 41b, 41c) is then projected by the respective individual lens 31b of the first lens group 31a, 31b, 31c precisely onto the associated individual lens 41b of the second lens group 41a, 41b, 41c. Crosstalk to adjacent individual lenses does not occur.

Figure 3:
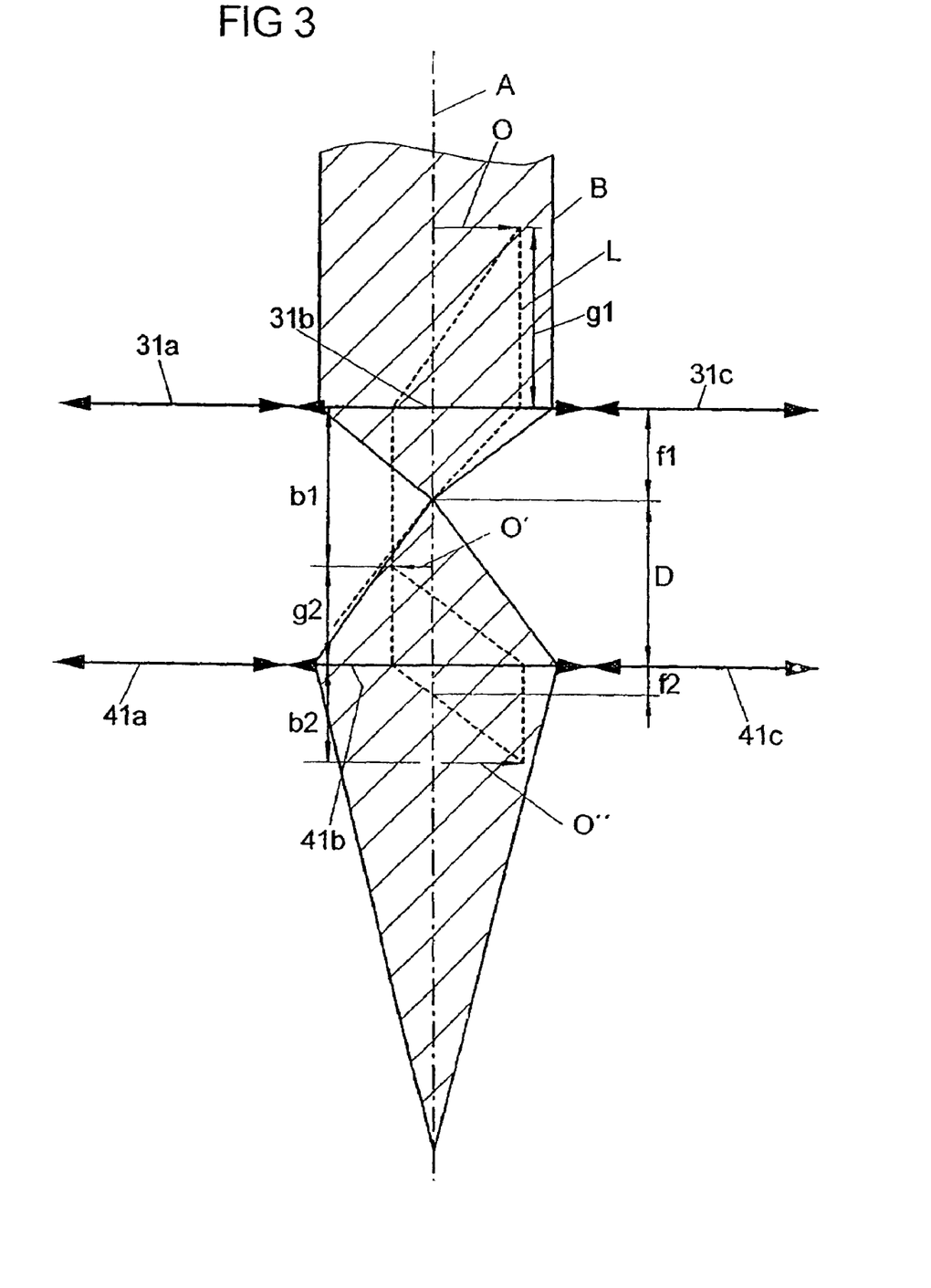
FIG. 3 shows a modification of the lens array of FIG. 2 to be used with the position measuring instrument of FIG. 1 in accordance with the present invention.

A corresponding arrangement is shown in FIG. 3. In this case, the equations pertaining to an image magnification $\beta = +1$ are as follows:

$$g1 = 2*f1^2/(f1-f2),$$

$$b2 = 2*f1*f2/(f1-f2),$$

$$\beta 1 = 1/\beta 2 = (f1-f2)/(f1+f2), \text{ and}$$

$$b2/g1 = f2/f1 < 1.$$

Thus to avoid crosstalk, the rule is that the total projection at the image magnification $\beta = 1$ must be split into a first, reducing projection at the image magnification $|\beta 1| << 1$ and subsequently a second, enlarging projection at the image magnification $|\beta 2| >> 1$.

As shown in FIG. 3, the crosstalk can in particular be eliminated whenever—given identical lens pattern constants of the first and second lens 31b, 41b and taking the above rules for the first and second projections into account—the focal length f2 of the second lens 41b is selected to be less than the focal length f1 of the first lens 31b; see FIG. 3.

With a view to other factors as well, it is advantageous to design the two projections such that first a reduction in size and then an enlargement occur. Thus the object width g1 of the first projection, because of tolerances in assembly and operation, typically varies on the order of magnitude of 0.1 mm. Because $$g1 = f1*(1+1/\beta 1),$$

the image is capable of changing from real to virtual, since the object to be projected comes into the focus of the lens element if $|f1/\beta 1|$ is on the order of magnitude of 0.1 mm. For micro lenses, which can be used in particular for forming the lens array 3, 4, the focal length is on the order of magnitude of 300 µm to 800 µm; therefore if this problem in terms of the requirement for $|f1/\beta 1| >> 0.1$ mm is to be avoided, it must be attained that $|\beta 1| << 3$. This is the condition for avoiding a turn down of the real images into virtual images.

Fundamentally, however, beyond the above condition, $|\beta 1| << 1$ should be selected, which markedly improves, namely lowers, the relationship between the scanning spacing tolerance and the object width g1. A correspondingly great object width of the first projection is also advantageous whenever, for protective reasons, a glass plate is to be disposed between the lens element and the scale.

In another variant, crosstalk between adjacent cells can be avoided by focused beam limitation, for instance using a diaphragm assembly. The point of departure here is the observation that in an optical projection, a variation in the object width by the factor $\beta^2$ has an effect on the image width and thus the image size. In a projection using the image magnification $\beta = 1$, variations in the object width would be expressed as corresponding variations in the image size. This can be counteracted to a certain extent by focused beam limitation, for instance by using telecentric lens elements, in which the course of the beam from the object to be projected to the downstream lens is oriented as parallel as possible to the optical axis. Such an arrangement can be attained for instance by disposing a perforated diaphragm at the focal point, toward the image, of the corresponding lens. The size of the hole then determines the widening of the focused beam. However, the hole of the perforated diaphragm cannot be embodied as arbitrarily small. Since the perforated diaphragm is an aperture diaphragm, it must be assured that the ratio between the radius of the hole and the focal length of the lens is greater than the sine of the first order diffraction angle for the object to be projected.

With this as the point of departure, the following is true: For an initially reducing projection ($|\beta 1| << 1$), the object width is much greater than the focal length of the first lens. Even without additional provisions, or in other words only because of the size of the lens opening, the focused beams are therefore so severely limited in their allowable widening that provision must be made for meeting the above-stated conditions for spatially localizing the first diffraction order beams. For the first projection, similar conditions therefore exist as with the telecentric lens element, so that are minimized by the influence of the image size and image location as a consequence of a variation of the reading distance. By such "telecentric properties" of the first projection and by means of exact mounting, the object width of the second projection, which is especially critical because of the condition $|\beta 2| >> 1|$, can then be suitably set.

Besides a limitation of the focused beam in the beam path between the two lenses 31b, 41b of a cell, crosstalk between the lenses of adjacent cells can also be attained by a modification of the aperture of the first lens 31b of the respective cell 31b, 41b, by placing suitable diaphragms between the lenses in the plane of the first lens group 31a, 31b, 31c.

Figure 4:
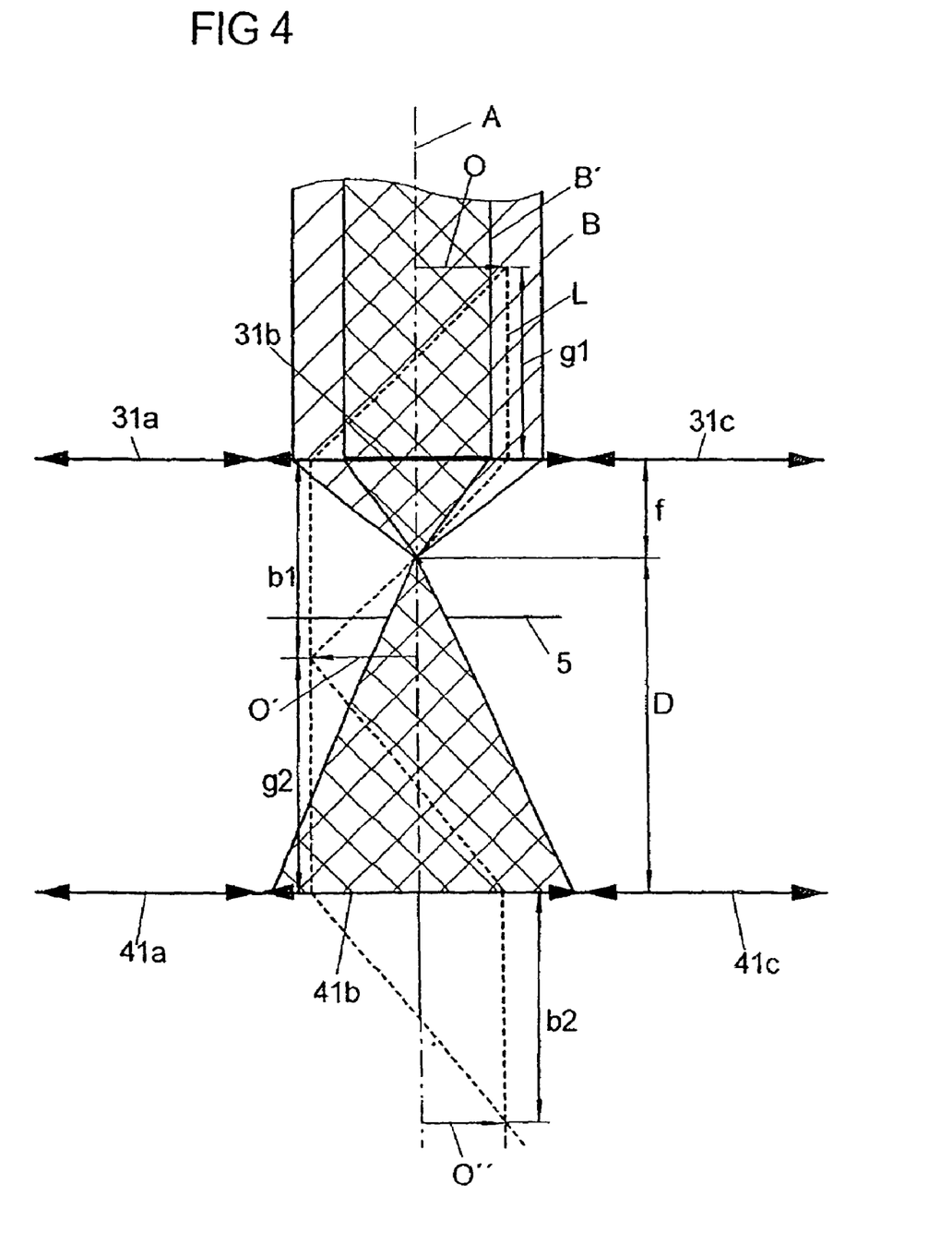
FIG. 4 shows a further modification of the lens array of FIG. 2 be used with the position measuring instrument of FIG. 1 in accordance with the present invention.

FIG. 4 shows an arrangement according to FIG. 2, in which each cell, such as the central cell 31b, 41b of the lens array 3, 4, is assigned a diaphragm 5, which is located downstream of the focal point of the first lens 31b as viewed from the first lens 31b of the cell 31b, 41b and as a result limits the focused beam B, diverging downstream of the focal point, in such a way that those beams of light that pass through the diaphragm 5 reach only the second lens 41b of the central cell 31b, 41b, but do not reach the second lenses 41a, 41c of adjacent cells 31a, 41a; 31c, 41c.

With collimated lighting, however, limiting the focused beam B by a diaphragm 5 reduces the object region, as indicated by the cross-hatched portion of the focused beam B shown in FIG. 4, which represents that proportion B' of the focused beam B that is allowed to pass through the diaphragm 5.

Figure 5:
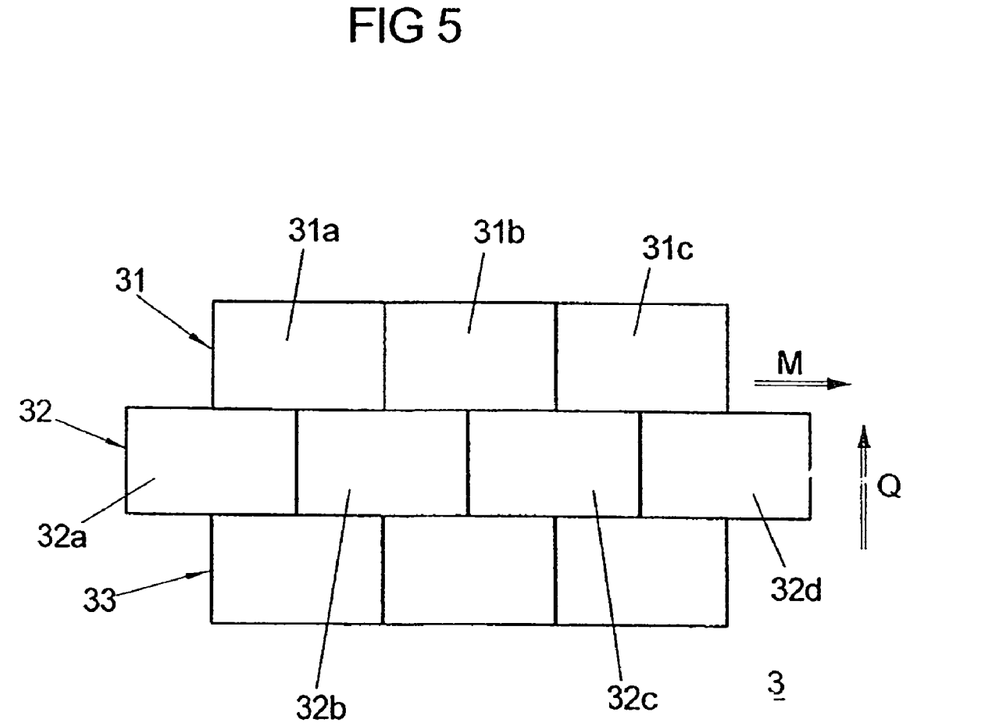
FIG. 5 is a plan view on a plane of the lens array of FIG. 1.

To avoid a loss of information associated with the use of a diaphragm structure of FIG. 4, it is possible as in FIG. 5 for the individual rows 31, 32, 33 of a lens group 3, which extend in the extension plane of the corresponding lens group 3 in the measurement direction M and are disposed side by side in a direction Q transverse to the measurement direction, to be offset from one another in the measurement direction M, so that one lens 31a, 31b, 31c in one row 31 each overlaps a plurality of lenses 32a, 32b; 32b, 32c; 32c, 32d of the adjacent row 32. Thus by the respective adjacent row (32), that part of an object which is blanked out in the other row (31) can be projected. Preferably, adjacent rows 31, 32 of the lens group 3 are each offset from one another by half the length of the lenses in the measurement direction M.

Alternatively, despite using a diaphragm to reduce crosstalk, a complete transmission of the object to be projected (without reducing the object region) can also be achieved by substituting divergent light for a collimated focused beam. Without an additional telecentric diaphragm, however, this would cause a loss in scanning spacing tolerance and, with an additional telecentric diaphragm, a loss of transmitted power.

In this connection, still another advantage will be pointed out in terms of stabilizing the code identification when lens groups 3, 4 in the form of lens arrays (that is, lens groups extending over a large area in one plane) are used. This pertains to the effects of reading spacing fluctuations on the image magnification in projecting the code sequences, provided on the measuring graduation, onto the detector. These scanning spacing fluctuations, that is, fluctuations in the spacing between the measuring graduation and the detector, can cause the light pattern transmitted no longer to fit the surface structure of the associated detector, in which case the code can no longer be recognized by the detector.

In all of the above exemplary embodiments, projections with an image magnification of $\beta=1$ have been assumed. For a positive image magnification $\beta$ with a value of less than 1, the image regions realized by the individual cells 31a; 41a; 31b, 41b; 31c, 41c remained separate from one another. In that case, the detector pattern would have to take into account not only the pattern of the code scanning but also the lens pattern as a superordinate structure. For a positive image magnification $\beta$ with a value greater than 1, by comparison, very tiny structures of the code track could be enlarged accordingly.

Instead of the lens array used in the above exemplary embodiments, in the form of two parallel lens groups 3, 4 disposed each in a respective plane 30, 40, a lens array extended in one plane, in the form of an array of gradient lenses, as known for instance from photocopiers, can be used to generate the desired positive image magnification. The individual lenses are then disposed in a hexagonal pattern, for instance, and their length is selected such that they project the object to be projected at the desired image magnification $\beta$, in particular the image magnification $\beta=1$. In such gradient lens arrays, optical crosstalk from one lens to the next is suppressed on the basis of a waveguide structure. However, the resolution capacity is less, compared to a lens array extending in two parallel planes, and the requisite length of the individual lenses is a hindrance to a compact structural form of a position measuring instrument.

Besides the exemplary embodiments described, it is understood that alternative variants also exist within the scope of the present invention.

We claim:

1. A scanning unit for a position measuring instrument for optical scanning of a measuring graduation, the scanning unit comprising:
   a light source that emits light in a direction towards a measuring graduation that generates modified light from said emitted light;
   a detector that receives said modified light; and
   a lens array, disposed upstream of said detector and comprising a first group of lenses disposed in a first plane that is oriented such that said modified light intersects said first plane and a second group of lenses disposed in a second plane extending parallel to said second plane, said lens array generates a defined image of a region of said measuring graduation, scanned by said emitted light, on said detector, wherein an image magnification of said lens array is greater than 0 and less than or equal to 2, wherein said first group of lenses are combined in one or more cells that includes a first cell that comprises:
      a first lens from said first group of lenses; and
      a second lens from said second group of lenses, wherein said first group of lenses are each disposed one after the other, perpendicular to said first plane and said second plane; and
   wherein at least some of said modified light first passes through said first lens and then reaches said second lens and wherein said modified light that passes through said first lens does not reach a lens of said second group of lenses that forms a second cell.

2. The scanning unit of claim 1, wherein said image magnification is equal to 1.

3. The scanning unit of claim 1, wherein said plane extends both in a measurement direction, in which said scanning unit is movable relative to said measuring graduation, and perpendicular to said measurement direction.

4. The scanning unit of claim 1, wherein said first group of lenses are disposed side-by-side in said plane and in a direction perpendicular to a measurement direction and are each offset from one another in said measurement direction.

5. The scanning unit of claim 1, wherein in said first cell a product of an image magnifications of said first lens and said second lens is less than or equal to 1.

6. The scanning unit of claim 1, wherein in said first cell an amount of image magnification of said first lens is less than an amount of image magnification of said second lens.

7. The scanning unit of claim 1, further comprising a diaphragm structure assigned to said lens array.

8. The scanning unit of claim 7, wherein said diaphragm structure is disposed in said plane.

9. The scanning unit of claim 7, wherein said diaphragm structure is disposed between said first group of lenses and said second group of lenses.

10. The scanning unit of claim 1, wherein said modified light is guided by said diaphragm structure in such a way that those beams which have passed through said first lens do not reach said lens of said second cell.

11. A scanning unit for a position measuring instrument for optical scanning of a measuring graduation, the scanning unit comprising:
a light source that emits light in a direction towards a measuring graduation that generates modified light from said emitted light;
a detector that receives said modified light; and
a lens array, disposed upstream of said detector and comprising a first group of lenses disposed in a first plane that is oriented such that said modified light intersects said first plane and a second group of lenses disposed in a second plane extending parallel to said second plane, said lens array generates a defined image of a region of said measuring graduation, scanned by said emitted light, on said detector, wherein an image magnification of said lens array is greater than 0 and less than or equal to 2, wherein said first group of lenses are combined in one or more cells that includes a first cell that comprises:
a first lens from said first group of lenses; and
a second lens from said second group of lenses, wherein said first group of lenses are each disposed one after the other, perpendicular to said first plane and said second plane, wherein in said first cell an amount of image magnification of said first lens is less than an amount of image magnification of said second lens.

12. The scanning unit of claim 11, wherein at least some of said modified light first passes through said first lens and then reaches said second lens.

13. The scanning unit of claim 12, wherein essentially all of said modified light that passes through said first lens then reaches said second lens.

14. The scanning unit of claim 12, further comprising a diaphragm structure assigned to said lens array.

15. The scanning unit of claim 14, wherein said diaphragm structure is disposed in said plane.

16. The scanning unit of claim 14, wherein said diaphragm structure is disposed between said first group of lenses and said second group of lenses.

17. The scanning unit of claim 14, wherein said diaphragm structure comprises a diaphragm assigned to said first cell.

18. The scanning unit of claim 14, wherein said diaphragm structure comprises a diaphragm assigned to said first cell.

19. The scanning unit of claim 18, wherein said modified light is guided by said diaphragm structure in such a way that those beams which have passed through said first lens do not reach said lens of said second cell.

20. The scanning unit of claim 12, wherein said modified light that passes through said first lens does not reach a lens of said second group of lenses that forms a second cell.

21. The scanning unit of claim 20, characterized in that an amount of image magnification of said first lens is less than an amount of image magnification of said second lens so that beams of a light beam which pass through said first lens do not reach said lens of said second group of lenses.

22. The scanning unit of claim 1, characterized in that an amount of image magnification of said first lens is less than an amount of image magnification of said second lens so that beams of a light beam which pass through said first lens do not reach said lens of said second group of lenses.

23. The scanning unit of claim 1, wherein focal lengths of said first group of lenses differ from focal lengths of said second group of lenses, and wherein a focal length of a first lens of said first group of lenses that said modified light passes through first is greater than a focal length of a second lens of said first group of lenses.

24. The scanning unit of claim 1, further comprising a diaphragm structure assigned to said lens array.

25. The scanning unit of claim 11, wherein said image magnification is equal to 1.

26. The scanning unit of claim 11, wherein said plane extends both in a measurement direction, in which said scanning unit is movable relative to said measuring graduation, and perpendicular to said measurement direction.

27. The scanning unit of claim 11, wherein said first group of lenses are disposed side-by-side in said plane and in a direction perpendicular to a measurement direction and are each offset from one another in said measurement direction.

28. The scanning unit of claim 11, wherein in said first cell a product of an image magnifications of said first lens and said second lens is less than or equal to 1.

29. The scanning unit of claim 11, wherein focal lengths of said first group of lenses differ from focal lengths of said second group of lenses, and wherein a focal length of a first lens of said first group of lenses that said modified light passes through first is greater than a focal length of a second lens of said first group of lenses.

30. The scanning unit of claim 11, further comprising a diaphragm structure assigned to said lens array.

31. A scanning unit for a position measuring instrument for optical scanning of a measuring graduation, the scanning unit comprising:
a light source that emits light in a direction towards a measuring graduation that generates modified light from said emitted light;
a detector that receives said modified light; and
a lens array, disposed upstream of said detector and comprising a first group of lenses disposed in a first plane that is oriented such that said modified light intersects said first plane and a second group of lenses disposed in a second plane extending parallel to said second plane, said lens array generates a defined image of a region of said measuring graduation, scanned by said emitted light, on said detector, wherein an image magnification of said lens array is greater than 0 and less than or equal to 2, wherein said first group of lenses are combined in one or more cells that includes a first cell that comprises:
a first lens from said first group of lenses; and
a second lens from said second group of lenses, wherein said first group of lenses are each disposed one after the other, perpendicular to said first plane and said second plane; and
a diaphragm structure assigned to said lens array, said diaphragm structure comprises a diaphragm assigned to said first cell, wherein said modified light is guided by said diaphragm structure in such a way that those beams which have passed through said first lens do not reach said lens of said second cell.

32. A position measuring instrument, comprising:
a measuring graduation comprising at least one optically scannable track; and a scanning unit comprising:
  a light source that emits light in a direction towards said measuring graduation so that said measuring graduation generates modified light from said emitted light;
  a detector that receives said modified light; and
  a lens array, disposed upstream of said detector and comprising a first group of lenses disposed in a first plane that is oriented such that said modified light intersects said first plane and a second group of lenses disposed in a second plane extending parallel to said second plane, said lens array generates a defined image of a region of said measuring graduation, scanned by said emitted light, on said detector, wherein an image magnification of said lens array is greater than 0 and less than or equal to 2, wherein said first group of lenses are combined in one or more cells that includes a first cell that comprises:
  a first lens from said first group of lenses; and
  a second lens from said first group of lenses, wherein said first group of lenses are each disposed one after the other, perpendicular to said first plane and said second plane; and
wherein at least some of said modified light first passes through said first lens and then reaches said second lens and, wherein said modified light that passes through said first lens does not reach a lens of said second group of lenses that forms a second cell.

33. The position measuring instrument of claim 32, wherein said plane extends both in a measurement direction, in which said scanning unit is movable relative to said measuring graduation, and perpendicular to said measurement direction.

34. The position measuring instrument of claim 32, further comprising a diaphragm structure assigned to said lens array.

35. A position measuring instrument, comprising:
a measuring graduation comprising at least one optically scannable track; and
a scanning unit comprising:
  a light source that emits light in a direction towards said measuring graduation so that said measuring graduation generates modified light from said emitted light;
  a detector that receives said modified light; and
  a lens array, disposed upstream of said detector and comprising a first group of lenses disposed in a first plane that is oriented such that said modified light intersects said first plane and a second group of lenses disposed in a second plane extending parallel to said second plane, said lens array generates a defined image of a region of said measuring graduation, scanned by said emitted light, on said detector, wherein an image magnification of said lens array is greater than 0 and less than or equal to 2, wherein said first group of lenses are combined in one or more cells that includes a first cell that comprises:
  a first lens from said first group of lenses; and
  a second lens from said first group of lenses, wherein said first group of lenses are each disposed one after the other, perpendicular to said first plane and said second plane, wherein said first group of lenses are disposed side-by-side in said first plane and in a direction perpendicular to a measurement direction and are each offset from one another in said measurement direction.

* * * * *